United States Patent [19]

Donaldson

[11] Patent Number: 4,632,278
[45] Date of Patent: Dec. 30, 1986

[54] DISPENSING CYLINDER WITH CYLINDRICAL HEATER

[75] Inventor: Michael J. Donaldson, Ottawa, Canada

[73] Assignee: Northern Teleco M Limited, Montreal, Canada

[21] Appl. No.: 802,410

[22] Filed: Nov. 27, 1985

[51] Int. Cl.$^4$ .............................................. B67D 5/62
[52] U.S. Cl. ................................ 222/146.5; 222/389; 219/230
[58] Field of Search ............... 222/146.2, 146.4, 146.5, 222/386, 389; 219/230, 421; 425/378 R, DIG. 13

[56] References Cited

U.S. PATENT DOCUMENTS

| 2,209,430 | 7/1940 | Turshin | 222/146.5 X |
| 2,684,105 | 7/1954 | Graves | 222/146.5 X |
| 3,318,481 | 5/1967 | Phillips et al. | 222/146.2 X |
| 3,851,801 | 12/1974 | Roth | 222/146.5 |
| 4,065,034 | 12/1977 | Callan | 219/230 X |
| 4,122,850 | 10/1978 | Bucalo | 219/230 X |
| 4,426,022 | 1/1984 | Lang et al. | 222/389 X |
| 4,528,150 | 7/1985 | Charlebois et al. | 264/328.4 X |

Primary Examiner—Joseph J. Rolla
Assistant Examiner—Frederick R. Handren
Attorney, Agent, or Firm—R. J. Austin

[57] ABSTRACT

A dispensing container for dispensing molten plastic into a mold, the container being piston operated and having a heater inside the container for minimizing the time required to melt solid plastic. The heater extends axially of the container while passing in sealing engagement with the piston which therefore slides upon the heater during its movement. The heater is preferably mounted at one end about a universal mounting from which the heater freely extends. This mounting allows for slight movement of the heater laterally if misalignment with the piston occurs.

4 Claims, 5 Drawing Figures

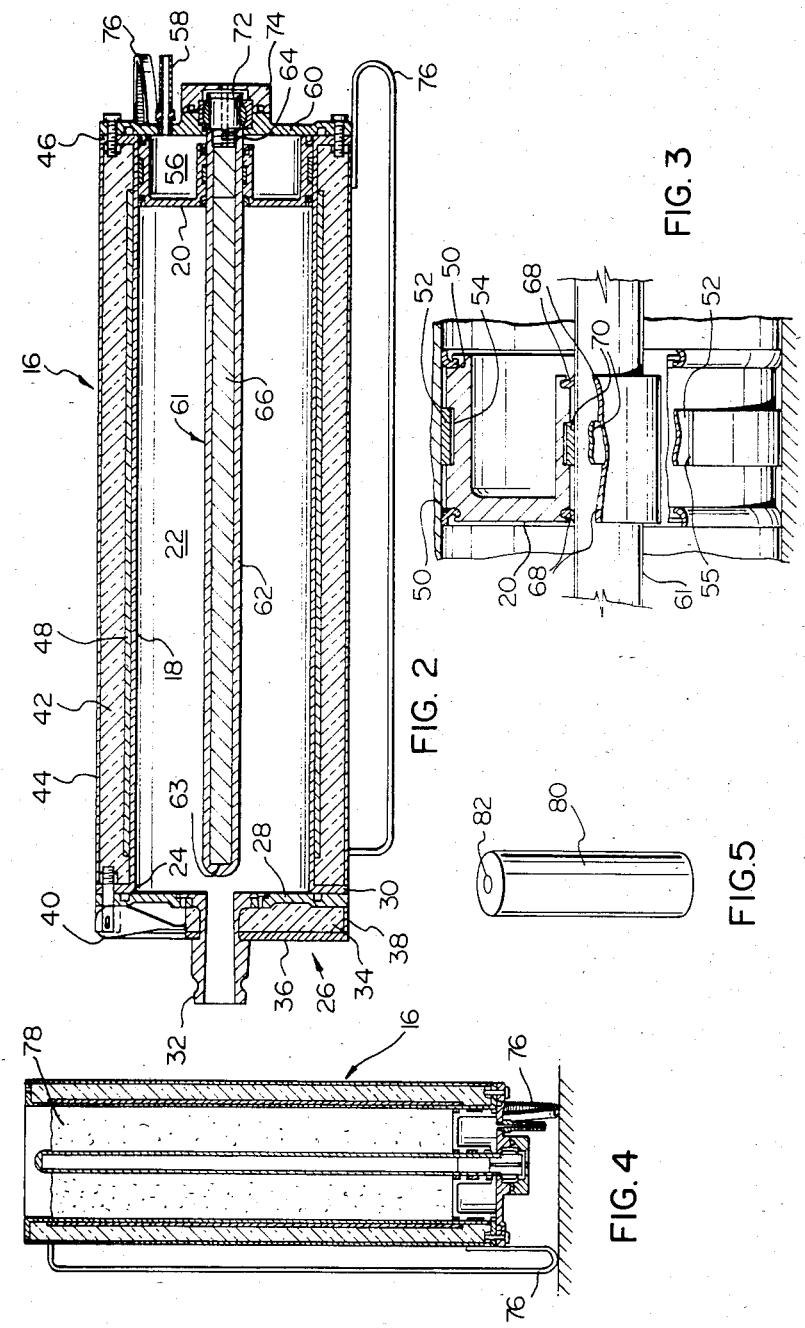

DISPENSING CYLINDER WITH CYLINDRICAL HEATER

This invention relates to dispensing containers for use in the molding of plastics encapsulations.

In some industries, it is necessary for operators working in the field to seal articles, for instance, against the effects of ambient conditions. Various methods of sealing have been suggested and one which has recently been proposed and has been successfully used is the method of sealing by providing a mold which surrounds the article and an encapsulation is formed around the article by transferring heated molten plastics material into the mold cavity and allowing it to cool and set. Encapsulations formed by molding techniques have successfully been employed in the telecommunications cable industry. In the telecommunications cable industry, it is necessary to form splices in the field and this involves cutting into a cable to enable the conductors to be reached. The conductors are then severed and connected to other conductors leading from the cable. It is then necessary to seal around the area of the splice to prevent the connections between the conductors from being adversely affected by atmospheric conditions, such as dampness, or affected by moisture conditions such as is found surrounding underground cables. The use of polymeric materials, as molded encapsulations around such splices, has simplified previous encapsulation procedures and also has cheapened the encapsulation process.

Successful methods of sealing, including molded encapsulations, have been described in U.S. Pat. Nos. 4,152,539 granted May 1, 1979 and 4,322,573 granted May 13, 1982, both patents being in the name of Leonard J. Charlebois.

Difficulties have been discovered in the provision of encapsulations in the field because no ready machinery has been available for the forming of encapsulations and it has been impractical to consider using factory equipment in the field. This problem is discussed in U.S. Pat. No. 4,528,150 granted July 9, 1985 and entitled "Method and Apparatus for Sealing Articles", in the names of Leonard J. Charlebois, Renato Mariani and Fred A. Huszarik. As described in this patent, plastics material is heated to a molten state by being extruded from extruders while being forced through the inlet of a reservoir defined within a manually portable accumulator. The material is maintained at a flowable temperature while held within the reservoir and the reservoir is disposed in communication with a mold cavity partly defined by the article to be sealed. The accumulator then acts as a dispensing container to force the molten material into the mold cavity at a sufficiently fast rate to fill the cavity before flow passages into the cavity become blocked with hardening material. This process and use of the dispensing container avoids the problems in using extruders for the mold cavity filling operation as discussed in the above two patents.

In addition to this, and in a modification of the above process, a method of encapsulating an article has been suggested and used in which solid plastics material is placed directly into a cylindrical dispensing container, the material then being heated to render it homogeneous. After allowing for the gases in the material to escape, the container is placed in communication with a mold cavity for the purpose of filling the cavity. One advantage of the latter process is that the container may be loaded with plastics material in the field and without having to rely upon the presence of an extruder. For the process to be practical however, it is necessary for the plastics material to be melted into its homogeneous state within a reasonable amount of time. If the time period for melting the plastic is extensive, then this may require preparation of the container full of molten plastic during the night or early morning prior to encapsulating an article. Such a procedure is inconvenient.

The present invention provides a container construction in the use of which the time spent in melting the plastics material is considerably reduced.

Accordingly, the present invention provides a dispensing container for dispensing molten plastics material, the container defining a cylinder and comprising a piston movable along the cylinder to change the volume of a cylindrical reservoir for plastics material on one side of the piston, the reservoir having an outlet for molten plastics material and the piston having means to move it along the cylinder and in sealing engagement with cylinder walls which define the reservoir, the container also including a heater which is disposed within and extends axially of the container while passing through and in sealing engagement with the piston so as to be disposed within the cylindrical reservoir, the piston moving along and in sealing engagement with the heater as the piston moves along the cylinder.

With a dispensing container according to the invention, it has been found that with the use of the heater that the time required to melt the plastics material into a usable condition has been reduced significantly. For instance, in one design of container, when filled with plastics material and having a heater surrounding the cylinder, but without the use of an internal heater, the time required to reduce the plastics material into a molten condition could extend to 7 hrs. However, with the additional use of the internal heater the time period to reduce the plastics material into molten condition is reduced from 2 to 3 hrs.

One embodiment of the invention will now be described by way of example, with reference to the accompanying drawings, in which:

FIG. 2 is a cross-sectional view in side elevation of the dispensing container;

FIG. 3 is on a larger scale and is a cross-sectional view through the container and showing a piston, partly in cross-section;

FIG. 4 is a view similar to FIG. 2, but showing the container in vertical condition after loading with solid particulate material; and FIG. 5 is an isometric view of a solid plastic billet for insertion into the container.

Figure 1:
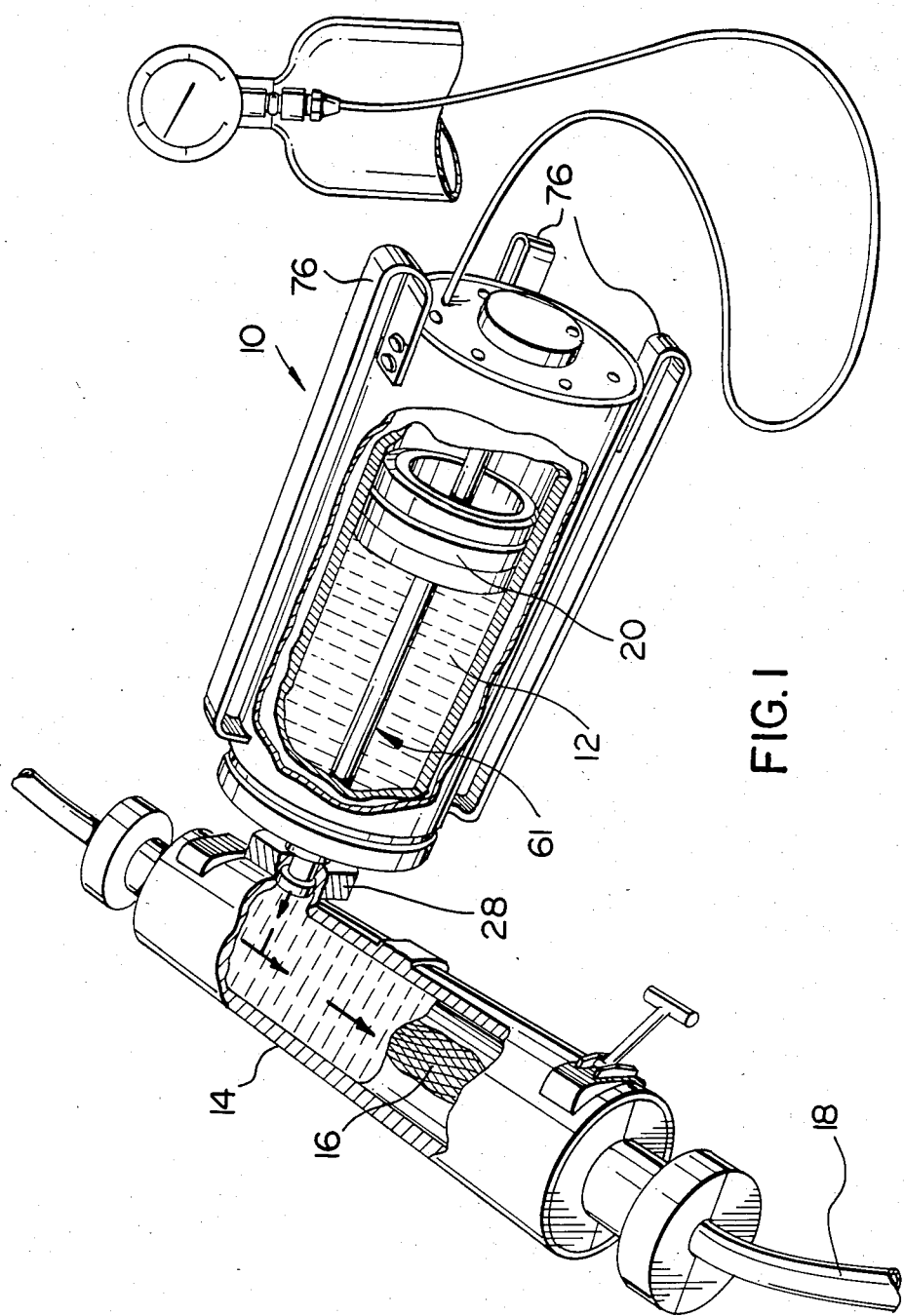
FIG. 1 is an isometric view, partly in cross-section, showing a dispensing container attached to a mold while plastics material is being injected into the mold cavity.

As shown in FIG. 1, a dispensing container 10 contains a quantity of molten plastics material 12, e.g. polyethylene, which is being dispensed into a mold 14 for forming an encapsulation around a spliced region 16 of a cable 18. As will be described, the plastics material has been provided in solid form originally within the container and has been heated in the container to render it molten and homogeneous. After gases in the material have been allowed to escape, then the molding operation takes place. The mold 14 is a low pressure mold, i.e. it operates below 100 psi pressure and may be of the construction described in U.S. Pat. Nos. 4,152,539 and 4,322,573. The mold is disposed in a normal setting for an in situ molding operation, that is, at the bottom of a pit in the ground for encapsulating sealed splices formed in an underground cable.

As shown by FIG. 2, the dispensing container 10 comprises a body 16 having a cylinder 18 containing a piston 20 which is slidable within the cylinder for increasing and decreasing the capacity of a reservoir 22 lying between the piston and an outlet end 24 of the container. A closure 26 of the container comprises a closure plate 28 which, in a reservoir closed position as shown in FIG. 2, seals against an outwardly extending annular flange 30 of the container at the outlet end. An outlet nozzle 32 is secured concentrically to the plate 28. The closure plate 28 carries a layer of insulation 34 which is in the form of glass wool insulation or other insulating material. Surrounding the insulation 34 is a protective metal sheet 36 which has a planar surface closely surrounding the nozzle and a peripheral flange 38 which extends around the sides of the insulation. The closure 26 is detachably mounted on the end of the cylinder 18 by quick release fastening means 40 which are mounted upon the closure plate 28 and pass through holes in the flange 30.

The body 16 also comprises a layer 42 of heat insulating material which closely surrounds the cylinder 18. The layer 42 is itself surrounded by a protective cylindrical metal cover 44 which extends between the flange 30 and a flange 46 at the other end of cylinder 18. Closely surrounding the cylinder 18 is an electrical heating element 48 which encircles the cylinder and lies within the layer 42 of insulating means.

The piston 20 is slidably movable along the cylinder 18 and is sealingly engaged with the walls of the cylinder by ring seals 50. The two seals are of a resilient nature and the piston is designed to be spaced slightly from the cylinder wall to form a small annular gap and reduce frictional contact during piston movement. To stabilize the piston within the cylinder so as to hold it concentric and prevent any twisting, a bearing is disposed between the two seals. As shown in FIG. 3, this bearing is a resilient polytetrafluorethylene ring 52 which is housed partly within a recess 54 of the piston and creates minimum friction in sliding contact with the cylinder wall. This ring is formed with one axial split 55 so that the ring is not continuous. The ring is however resilient in a radially outward direction so that it will engage the cylinder wall to stabilize the piston by minimizing any twisting motion of the piston in any plane containing the contained axis. The ring also presents a low friction surface contact with the cylinder wall. Instead of the use of a single ring, such as the ring 52, it is to be understood that two or more axially spaced rings may be employed.

A fluid-operated means is provided to move the piston along the cylinder for increasing and decreasing the size of the reservoir 22. On the side of the piston remote from the reservoir 22 is a chamber 56 which may be supplied with air under pressure through an inlet 58 of the fluid-operated means, the inlet passing through an end wall 60 of the container. As may be seen, upon pressurized air being admitted to the chamber 56, the piston is forced to move from its position in FIG. 2 and along the chamber to dispel molten plastics material contained within the reservoir 22. On the other hand, if the pressure in the chamber 56 is reduced to normal atmospheric pressure, then the piston may be forced manually to the right-hand end of the container as shown in FIG. 2 when a new charge of solid plastics material is added to the reservoir. Alternatively, the inlet 58 may be connected to reduced air pressure conditions to return the piston to the right-hand end of the container due to the differential pressures on its two opposite surfaces.

It is an important feature of the present invention that the container includes a cylindrical heater 61 which lies within the container itself and also within the reservoir so as to contact directly the solid plastics material to be melted. As may be seen from FIG. 2, the cylindrical heater comprises an aluminum tube 62 which extends coaxially through the reservoir and has a closed end 63 located closely adjacent to the outlet 32. The aluminum tube has an open end 64 mounted concentrically with the container through an opening in the end wall 60. An electric heating core 66 within the tube is connected to a source of electric power through the open end 64 of the tube.

As may be seen from FIG. 3, because of the disposition of the heater, it is necessary for it to pass through the piston 20. For this purpose, the piston is provided with seals 68 disposed in grooves around an inner concentric cylindrical passage of the piston. These seals engage the outer surface of the aluminum tube while a small annular space exists between the tube and the passage surface. Another polytetrafluorethylene ring 70 (if required) is located in a groove within the piston and this ring 70 engages the aluminum tube. The ring 70 is for the purpose of maintaining substantially concentric relationship between the aluminum tube and the piston while minimizing the frictional load created by sliding contact with the tube.

It is an important aspect of the present invention that the heater 61 is mounted for universal movement at its open end. As may be seen, this universal movement is provided by a semi-spherical ball 72 which is attached to the end 64 of the aluminum tube and is held in a partly spherical seat formed between the end wall 60 and an end cap 74. Thus the ball 72 is movable in universal fashion within its seat to convey a universal movement to the aluminum rod of the heater. While the heater is thus mounted generally coaxially within the reservoir 22, it is apparent that some lateral pivotal movement of the heater in any direction will be permissible. In the present case, such a movement is considered a preferred requirement so that the heater is allowed to float with respect to the reservoir during piston movement. It follows that if there is any slight misalignment between the piston and the heater, then this misalignment may be corrected during movement of the piston by pivoting of the heater within its seat. Hence, any possibility of seizure between the piston and the heater element is avoided.

In use of the container, it is disposed in an upright or vertical position as shown in FIG. 4. This is made possible by the fact that the container is provided with three or more support legs 76 which have ends projecting beyond the end wall 60 and the end cap 74. With the closure 26 removed, the reservoir 22 is filled with particulate plastics material 78 as shown by FIG. 4. The heaters 48 and 61 are then energized to melt the material into a homogeneous form within the reservoir. It is found that the time required for this particular operation is from 2 to 3 hrs. for a reservoir capacity of 20 lbs of plastics material. This is substantially less than the time required to heat the same amount of material in the reservoir solely with the use of the external heater 48.

After the material has been rendered into molten form, the closure 26 is replaced and the reservoir is maintained in its vertical position for a sufficient length of time to allow all the gases to escape from the molten material into the top of the reservoir. The piston is then moved up slightly for a sufficient distance to dispel all of the gases from the reservoir and ensure that both the reservoir and the outlet 32 are completely filled with the molten material. The container is then ready to be connected to the mold for the molding operation which has been described.

In a modification of the above embodiment, instead of use of the particulate material 78, a slug 80 of the solid material is used (FIG. 5). This slug is formed by extrusion and, of course, requires the formation of a coaxial passage 82 during the extrusion process to enable the slug to be positioned within the reservoir with the heater 61 located within the passage 82. It is advisable for the slug to be as closely fitting as possible to the container wall and also to the heater 61 to ensure that any air gaps which are initially provided are as small as possible.

What is claimed is:

1. A dispensing container for dispensing molten plastics material, the container defining a cylinder and comprising a piston movable along the cylinder to change the volume of a cylindrical reservoir for plastics material on one side of the piston, the reservoir having an outlet for molten plastics material and the piston having means to move it along the cylinder and in sealing engagement with cylinder walls which define the reservoir, the container also including a cylindrical heater which is disposed within and extends axially of the container while passing through and in sealing engagement with the piston so as to be disposed within the cylindrical reservoir, the piston moving along and in sealing engagement with the heater as the piston moves along the cylinder.

2. A container according to claim 1 wherein the heater extends coaxially through the piston and along the reservoir.

3. A container according to claim 1 wherein one end of the heater is mounted for universal movement and the heater extends freely from said one end and through the piston and wherein a clearance is provided between the piston and the heater and a radially resilient seal is provided between the piston and the heater.

4. A container according to claim 1 including a further heater surrounding the reservoir.

* * * * *